US005784512A

United States Patent [19]
Hensen

[11] Patent Number: 5,784,512
[45] Date of Patent: Jul. 21, 1998

[54] LENS CONNECTOR FOR OPTICAL THROUGH-CONNECTION OF LIGHT GUIDES

[75] Inventor: Robertus Maria Hensen, Heerlen, Netherlands

[73] Assignee: Holec Projects B.V., Netherlands

[21] Appl. No.: 793,962

[22] PCT Filed: Sep. 6, 1995

[86] PCT No.: PCT/NL95/00302

§ 371 Date: Mar. 7, 1997

§ 102(e) Date: Mar. 7, 1997

[87] PCT Pub. No.: WO96/07944

PCT Pub. Date: Mar. 14, 1996

[30] Foreign Application Priority Data

Sep. 8, 1994 [NL] Netherlands ............... 9401466

[51] Int. Cl.[6] ................................................. G02B 6/38
[52] U.S. Cl. ............................................................ 385/61
[58] Field of Search ........................... 385/61, 31, 32, 385/33, 88, 93, 147, 75, 76, 79

[56] References Cited

U.S. PATENT DOCUMENTS

| 4,162,119 | 7/1979 | Goodman | 385/73 |
| 4,531,810 | 7/1985 | Carlsen | 385/79 |
| 4,868,361 | 9/1989 | Chande et al. | 385/50 |
| 4,925,267 | 5/1990 | Plummer et al. | 385/74 |
| 5,392,373 | 2/1995 | Essert | 385/92 |
| 5,515,469 | 5/1996 | Zarem et al. | 385/92 |
| 5,548,677 | 8/1996 | Kakii et al. | 385/92 |

FOREIGN PATENT DOCUMENTS

| 0113024 | 7/1984 | European Pat. Off. |
| 0168261 | 1/1986 | European Pat. Off. |
| 0206943 | 12/1986 | European Pat. Off. |
| 0224664 | 6/1987 | European Pat. Off. |
| WO9317359 | 9/1993 | WIPO |

*Primary Examiner*—Akm E. Ullah
*Attorney, Agent, or Firm*—Handal & Morofsky

[57] ABSTRACT

Lens connector for optical through-connection of light guides, which comprises two lens connector halves whose frontal faces face one another. The lens connector half (1) comprises a coupling housing provided with an internal space open at the front and rear of the coupling housing and with an optical system housed in the front-most portion of the internal space. The end of the light guide is fastened in the rearmost portion of the internal space (22). In the one lens connector half the light beam emanating from the guide fastened therein is widened by the optical system (24) and in the other lens connector half the received light beam is focused, by the optical system housed therein, onto the light guide associated therewith. For the purpose of mutual alignment of the lens connector halves, alignment means are present which are formed by optically transparent locating faces (20) which are disposed concentrically at the front of the coupling housings, are oriented perpendicular to the optical axes of the light beams running through the optical systems and project outside the front of the coupling housings.

20 Claims, 2 Drawing Sheets

LENS CONNECTOR FOR OPTICAL THROUGH-CONNECTION OF LIGHT GUIDES

SUMMARY OF THE INVENTION

The invention relates to a lens connector for optical through-connection of light guides, comprising two lens connector halves whose frontal faces face one another and which each comprise a coupling housing provided with an internal space open at the front and rear of the coupling housing and with an optical system housed in the frontmost portion of the internal space, the end of the light guide being fastened in the rearmost portion of the internal space, all this being arranged in such a way that in the one lens connector half the light beam emanating from the guide fastened therein is widened by the optical system and in the other lens connector half the received light beam is focused, by the optical system housed therein, onto the light guide associated therewith, aligning means being present for the mutual alignment of the lens connector halves.

A connector of this type is disclosed by the International Patent Application WO 93/17359.

Various connecting methods and types of connectors for light guides are known, viz the fused-splice join, the so-called BUTT-coupled connector and the lens connector.

In the case of the fused-splice join, the ends of the glass fibre cable are joined to one another permanently in a laboratory by means of fusing or gluing. Welding of the glass fibre cable ends precludes contamination and consequently attenuation, but it is no longer possible to take the coupling apart.

In the case of the BUTT-coupled connector, also known as direct connector, the ends of the glass fibre cable are pushed into a ferrule provided with a small amount of adhesive. This adhesive is cured and the glass fibre cable is then ground down in a holder and is then polished. The same is done to the glass fibre cable which is to be connected thereto. The two ferrules which form the precision elements of the connector halves, are pushed into a sleeve, a requirement being for the glass fibre cables to form a precise fit by their end faces and to be in line with each other. Any deviation, however small, leads to large attenuation losses by which the transmission of information is seriously disturbed.

In the case of the lens connector the two glass fibre cable ends, ground down and polished, have positioned between them two lenses, one each for each glass fibre cable. The light beam from the one glass fibre cable is widened by the one lens and is preferably parallelized, and by the other lens is focused again onto the other glass fibre cable. Between the connector sections to be coupled, the light ray is thus parallel and much wider than the light beam in the glass fibre cable itself. The lens connector is therefore largely insensitive to particles of dust on the glass fibre cable and to any centre line errors.

The lens connector according to the International Patent Application WO 93/17359 comprises two lens connector halves, each lens connector half comprising a coupling housing with a continuous internal space. The end of one or more light guides to be through-connected is fastened in a plug which is accommodated in the rearmost portion of the internal space of the coupling housing and is retained therein. Adjoining the free end of the plug there is positioned, in the frontmost portion of the internal space, an optical system in the form of a rod lens. The through connection is achieved by the two connector halves being positioned on top of one another with the lenses facing one another, the alignment of the coupling housings and the mutual fastening thereof being effected with the aid of coupling sleeves which are fastened to the free end of the respective coupling housing by means of a press fit.

The coupling sleeves are provided with pins and recesses, in the coupled state the pins of the one coupling sleeve being inserted into the recesses of the other coupling sleeve. Thus a concentric alignment is achieved. Angular errors which are caused by the centre lines of the lens connector halves forming an angle with each other, are not corrected, however.

The abovementioned connectors are suitable only for a stable, rigid environment, i.e. a movement of the connector halves with respect to one another is not possible. Further, the lens connector halves are not entirely identical with one another, and the components require a fairly accurate tolerance.

It is an object of the invention to provide a lens connector of the type mentioned in the preamble, which is suitable for a rough environment involving exigent influencing factors, e.g. in the case of traction and power switches which consist of a movable section and a stationary section, and for this purpose has some flexibility. The lens connectors employed in this case serve for through-connection of light guides designed for control lines and in formation lines.

Another object of the invention is to provide a connector of the type mentioned in the preamble, alignment being optimal without employing accurate set pins, locating edges and the like, and the connector being temperature-insensitive.

A further object of the invention is to provide a lens connector whose lens connector halves can be coupled and uncoupled many times without difficulty.

The abovementioned objectives are achieved according to the invention by the aligning means being formed by optically transparent locating faces which are disposed concentrically at the front of the coupling housings, are oriented perpendicular to the optical axes of the light beams running through the optical systems and project outside the front of the coupling housings.

As a result of employing the locating faces of the lens connector halves, no wear is produced as in the prior art, alignment often being effected by the connectors being pushed into one another. Alignment of the lens connector according to the invention takes place much more easily by means of the locating faces, while these can easily be cleaned and kept clean, owing to them projecting outside the frontal plane of the lens connector halves and no obstacles being present such as set pins or locating edges and the like.

Preferably, the locating face is formed by the frontal plane of a transparent front plate fastened centrally to the front of the coupling housing.

Employing this separate front plate achieves greater flexibility in the choice between the material of the coupling housings of the lens connector halves and the alignment means formed by the front plate. Preferably, the front plate is made of a hard scratch resistant material, and a front plate made of sapphire proved particularly suitable in practice. This provides a free choice of material of the coupling housing, so that the choice can preferably be based on expansion coefficients and the various components of the lens connector half, owing to which the lens connector is insensitive to temperature variations. However, at least the inner face of the front plate is provided with an antireflective layer, low transition losses being achieved as a result.

In the case of a preferably employed embodiment of the invention, the coupling housing comprises separate lens and guide accommodation sections which are fastened to one another by means of fastening means, for example by means of bolts. As a result of the said parts being split, a plane of separation between said accommodation sections is achieved, resulting in the creation of an additional option for achieving optimum alignment. Concentricity errors such as angular errors and centre line errors between lens and guide and any lens errors can consequently be corrected in a simple and accurate manner. Furthermore, the separation results in flexibility being achieved with respect to the guide end terminations, and said terminations can be less critical. Splitting into two accommodation sections further provides the additional option of employing standard cable end terminations and replacing them in the case of defects.

In order to optimize the temperature dependence of the lens connector, the material of the lens accommodation sections and/or guide accommodation sections has an expansion coefficient which corresponds as accurately as possible to that of the material of the front plate. Titanium or a titanium-containing material proves particularly suitable in combination with a front plate made of sapphire.

In the case of one advantageous embodiment of the invention, at least one lens connector half is housed in the internal space of a sheath half of the connector and by means of a flexible fastening means is joined to the respective sheath housing half. This provides the advantage that an automatic correction of mutual deviations of the lens connector halves in a horizontal, vertical and axial direction is effected. The flexible fastening means preferably takes the form of an element which consists of silicone rubber which is attached, on the one hand, to the respective lens connector halves and, on the other hand, to the sheath housing half.

Owing to the optimum alignment achieved by means of the invention, the coupling of the lens connector half is not rotation-sensitive.

Embodiments of the invention are specified in the accompanying subordinate claims.

BRIEF DESCRIPTION OF THE DRAWINGS

The invention will be explained hereinafter in more detail with reference to the drawing, in which.

Among the detachable optical connectors, the lens connectors provide a number of specific characteristics which obviously are not provided by the fused-splice joins nor indeed by the BUTT connectors. The most important of these is probably the option of coupling light guides without these touching one another. This means that the risk of damage becomes virtually nil, which is of very great importance for systems where reliability plays a major role. In rough environments in particular, such as those existing in the case of traction and large power switches having movable carriages, the problem of wear and dust is great. The lens connectors have a number of important advantages such as e.g.:

the coupling can take place without damage to the fibres,
dust on or between the fibre surfaces can never block the connection, owing to, as will be explained hereinafter, a widened light beam being employed,
a very robust construction is possible.

Figure 1:
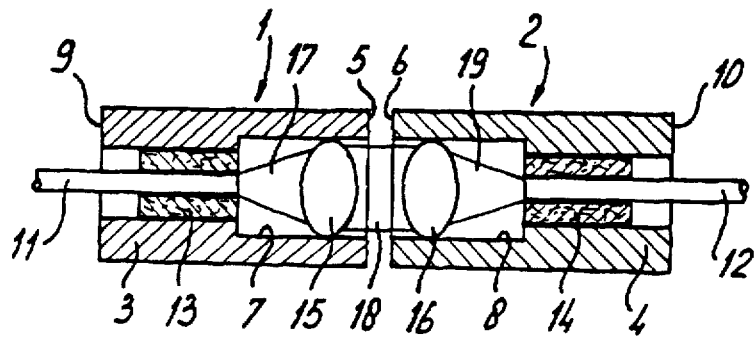
FIG. 1 schematically shows a sectional view of an embodiment of a lens connector.

FIG. 1 schematically shows a lens connector which consists of the lens connector halves 1 and 2.

The lens connector halves 1 and 2 consist of the respective coupling housings 3 and 4 whose frontal planes 5 and 6 face one another. The coupling housings 3 and 4 have an internal space 7 and 8, respectively, which are open, on the one hand, at the frontal planes 5, 6 and, on the other hand, at the rear planes 9, 10 of the coupling housings 3, 4. Inserted into said continuous internal space 7, 8 of the coupling housings 3, 4 from the rear side 9, 10 there is a light guide 11, 12, the free ends of the light guides 11, 12 being embedded in the coupling housings 3, 4 by means of elements 13, 14 consisting of embedding material. At the front end of the coupling housings 3, 4 a lens 15, 16 is fastened in the internal space associated therewith.

From left to right, the light guide 11 ends in front of the lens 15 and the light from the light guide 11 impinges onto the lens 15, after which the light received by the lens 16 from the lens 15 arrives at the end face of the light guide 12.

Connection of the light guides therefore takes place by means of lenses which are positioned at a certain distance behind and in front of, respectively, a light guide end. The light exiting from the light guide 11 has an angular aperture or numerical aperture N.A., which is defined in the light guide itself by means of the choice of the refractive indices of the core and the cladding of the light guide. These two refractive indices determine the angle at which total reflection takes place, which is also known as the critical angle. This critical angle has a direct relationship to the numerical aperture N.A. of the light guide, which is equal to sin ½ α, α being the angle of the light beam exiting from the light guide at the interface of the end face of the light guide and air.

If a rod lens is employed such as is used, e.g., in the lens connector according to the invention, the numerical aperture N.A. differs from that in air, being equal to sin ½ α/$n_{lens}$, $n_{lens}$ being equal to the refractive index of the lens material in air.

This therefore gives a reduced dispersion of the light. The product of sin ½ α/$n_{lens}$ and the lens length in mm is the radius of the beam width. This product is a determining factor for the diameter of the lens (at least 2×radius of the beam width).

In the case of the lens connector according to the invention, the light beam 17 exiting from the light guide 11 is converted, by means of the lens 15 drawn schematically, into a parallel light beam 18 whose beam width is greater than that of the light beam in the light guide 11. Said wider light beam 18 is converted, by the schematically drawn lens 16, into the light beam 17 which is focused by the lens 16 onto the end face of the light guide 11.

Usually the surface available for positioning a lens connector is very restricted, if a single contact position were to be used for this purpose. This is because lens connectors must be positioned on top of one another with an accuracy of less than 2 minutes of arc. In other words, the centre lines of the connector halves must run parallel to within 2 minutes of arc, although it is permissible for the centre lines to be at some distance from one another, depending on the width of the light beam. For a number of reasons, the light beam in a lens connector must not, however, be too narrow. These reasons are, inter alia:

a mote of dust in the light beam must not cause appreciable attenuation, a specific centre line distance must go hand in hand with only a small attenuation.

Parallelism of the light beams requires a somewhat wider design, which also provides space for a wide light beam. Wide is herein understood as a beam of at most 6 mm. In the case of a light guide of 100 µm this means a transformation factor (widening factor) of the light ray of 60. If the light guide is 50 µm, this even turns into a factor of 120. The larger the transformation factor, however, the more critical is the requirement of parallelism of the centre lines of the coupling halves. It was found that a lens connector having a transformation factor of from 30 to 50 results in optimum transmission of light. An associated advantage of the connector according to the invention is that it is completely insensitive to light impinging "incorrectly" or "obliquely".

For the purpose of optical through-connection of the light guides 11 and 12, the lens connector halves are positioned in line with one another and are fixed, alignment of the light connector halves requiring the use of alignment means. According to the invention, the alignment means are formed by optically transparent locating faces which are positioned concentrically on the front face 5, 6 of the coupling housings 3, 4. These locating faces are perpendicular to the optical axes of the light beams running through the optical systems (lenses) of the lens connector halves and preferably project outside the front face of the coupling housings. Such a locating face can be formed by a separate locating ring which is incorporated, at least in part, in the front face of the coupling housing and at the same time projects beyond the frontal face of the coupling housing. The diameter of the hole in the ring is such that the light beam is able to pass through the ring via said hole.

Figure 2:
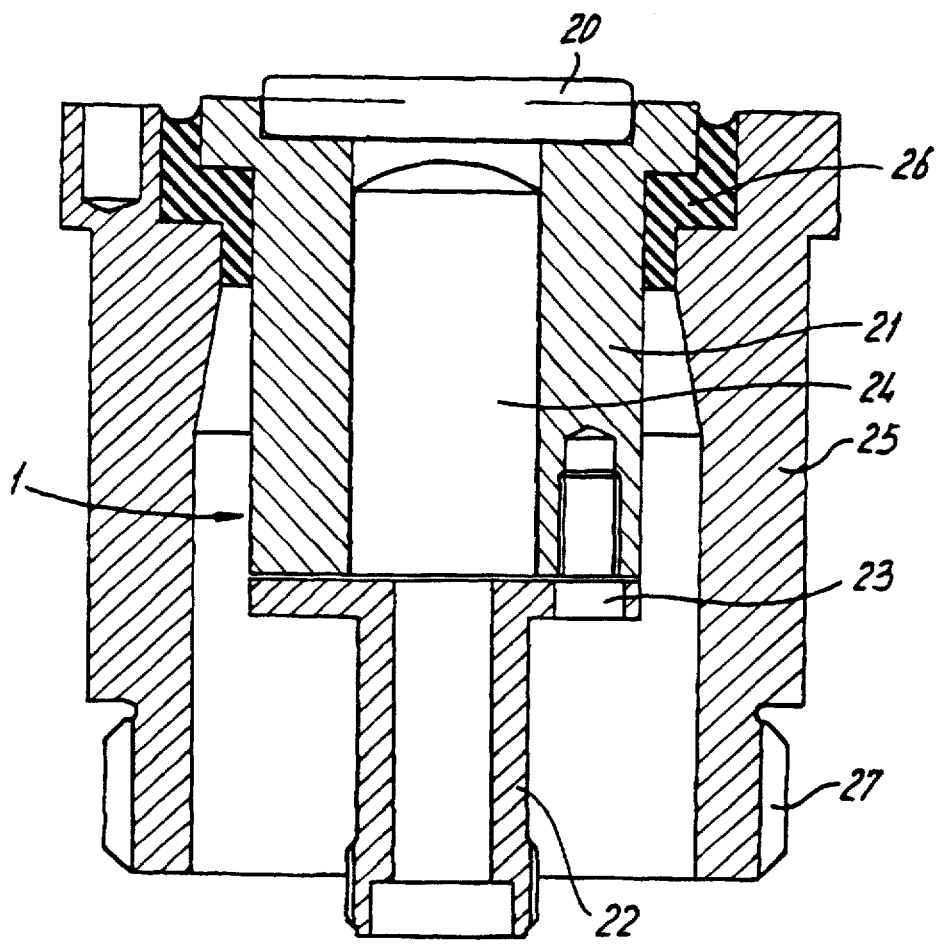
FIG. 2 shows a sectional view of a preferably employed lens connector half according to the invention.

According to the invention, the locating face is preferably formed by a transparent front plate 20, as is employed in the preferred embodiment, shown in FIG. 2, of the lens connector half according to the invention, said front plate at the same time acting as a protective seal.

Figure 3:
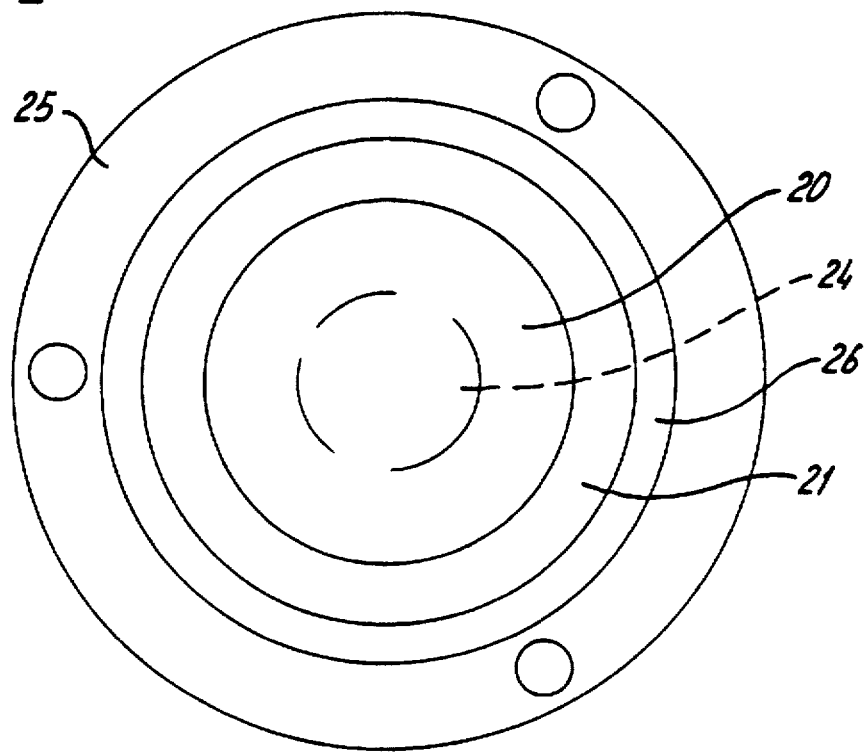
FIG. 3 shows a plan view from above of the lens connector according to FIG. 2.
Figure 4:
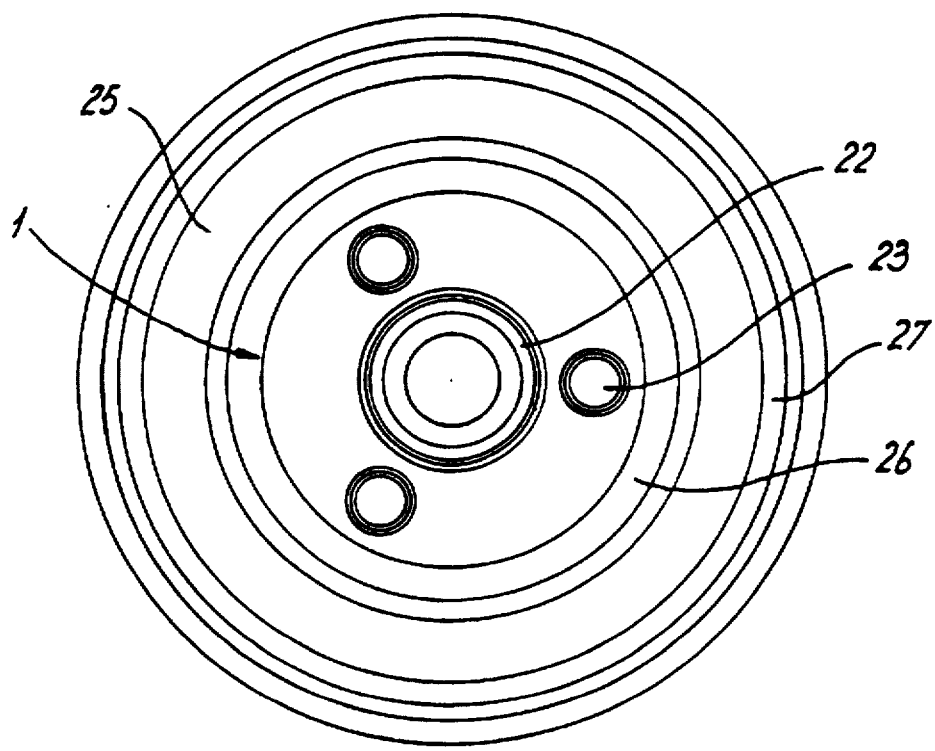
FIG. 4 shows a plan view from below of the lens connector according to FIG. 2.

In the case of the optical connector half shown in FIGS. 2, 3 and 4, only one lens connector half is accommodated in a sheath half, but it is evident that it is possible for one sheath half to house a number of lens connector halves.

The coupling housing of the lens connector half shown in FIGS. 2, 3 and 4 consists of two separate sections, viz the lens accommodation section 21 and the guide accommodation section 22. Said two sections are fastened to one another by means of flanges and bolts 23. As a result of two separate sections being used it is possible to bring about an optimum alignment and possibly to correct lens errors. The components consequently need not satisfy very narrow tolerances. In addition it is easily possible to make the guide accommodation section suitable to accommodate standard cable terminations, for example of the SMA, ST or SC type. In the internal space of the guide accommodation section, the end of a light guide (not shown) can be embedded by means of embedding material. Other fastenings, for example from the prior art (SMA, ST, SC type etc.) are possible, however. Disposed in the internal space of the lens accommodation section 21 there is an optical system which, in the case of this embodiment, comprises a rod lens 24. Said rod lens has a planar rear and a spherical front. The light guide (not shown) will then end near the planar rear of the rod lens, and the light beam coming from the light guide 11 is converted, by means of the rod lens 24, into a parallel beam. Said internal light beam then hits the front plate 20 which transmits said beam, the transmitted beam being received, in the coupled state of the lens connector, by another lens connector half (not shown) of the optical connector. The front plate 20 consists of hard scratch resistant material and is preferably made of sapphire. To give a value convenient in practice, said front plate projects approximately 0.5 mm outside the coupling housing.

In order to limit light losses, the front plate 20 is made of sapphire, chosen because of the high scratch resistance of this material, in any case on the inside provided with an antireflective layer. This layer may be applied to the sapphire by vapour deposition and should itself have a refractive index which is equal to the root of the refractive index of the sapphire. The result is that this layer transmits virtually all the light. The top of the sapphire plate which is exposed to wind and weather and dust will probably not be coated, unless coating layers having a greater hardness than sapphire can be employed.

Optionally it may also be possible for the rod lens 24 to be provided with such an antireflective layer, but these already have a lower refractive index, such that the natural reflection in some applications is already sufficiently low.

The coupling housing of the embodiment shown in FIGS. 2, 3 and 4 is constructed in two sections, viz a detached lens accommodation section and guide accommodation section, because this makes it possible for the light guide and lens to be aligned perfectly with respect to one another and the lens connector can be made suitable for any existing cable terminations and therefore is also readily replaceable.

Great importance attaches to the choice of materials. These materials, because of the rough environment, must be strong and corrosion-resistant, but at the same time the expansion coefficient must be equal or almost equal to that of the material used for the optical system of the lens connector. The optical system used in the embodiment of FIGS. 2, 3 and 4 comprises a rod lens made of glass which has expansion coefficient of $4-8\times10^{-6}$. Therefore, the lens accommodation section and guide accommodation section are made from titanium which has a large degree of corrosion resistance with respect to the environment to which the materials, for example in the case of traction or large power switches, are exposed. Titanium has an expansion coefficient of $8\times10^{-6}$. Obviously, various titanium-containing materials having the required properties are possible.

The scratch-resistant front plate 20 is preferably made from sapphire having an expansion coefficient of $4.8\times10^{-6}$. This is therefore very close to that of the materials mentioned hereinabove.

Owing to the above-described mutual matching of the expansion coefficients of the various components, the connector is temperature-insensitive.

The lens connector half 1 therefore has a front plate 20 from which the light, to very high accuracy, emerges perpendicularly. Coupling of said lens connector half with another one takes place by the front plates of these connector halves being forced onto one another, so that optimum alignment is achieved without the use of locating rings or telescopic sleeves as with known connector halves. After all, all telescopic sleeves require very accurate fits and will also be subject to wear and contamination in the case of frequent coupling, which will play a major negative role, particularly under rough and heavily contaminating conditions.

Positioning of the connector halves takes place in the plane perpendicular to the light beam outside the connector halves themselves, and a tolerance of ±0.4 mm proved quite satisfactory.

The lens connector half 1 is retained against another lens connector half 2 (see FIG. 1) by means of the respective sheath halves 25. The material of said sheath halves may be plastic or any other material suitable for the conditions in question, although it is preferable for these sheath halves likewise to be made from titanium or a titanium-containing material, given the rough environment for which the lens connector according to the invention is designed.

Preferably, the lens connector half 1 is joined flexibly to the respective sheath half 25. This fastening, in the case of the embodiment shown in FIGS. 2, 3 and 4, is designed as a fastening element 26 made of silicone rubber, said element being attached, on the one hand, to the lens connector 1 and, on the other hand, to the sheath half 25. In this arrangement, some flexibility is achieved between the innermost and the outermost section of the optical connector, as a result of which deviations in a horizontal, vertical and axial direction can be absorbed within certain limits and the light rays are always crossing, from the one to the other connector half, in parallel with the centre line. This is of even greater importance if it is necessary to accommodate a number of lens connector halves 1 in one sheath half 25, it then being possible to employ a disc-shaped fastening element (not shown) which is attached to the sheath half 25 and in which the various lens connector halves 1 are embedded.

The rear end of the sheath half 25 is provided with a thread 27 for the purpose of securing on the sheath half 25, by screwing, a cap nut which can be used for fastening relief means of the light guides and sealing means for the internal space, open at the rear, of the sheath half 25.

It is preferable to employ mutually identical lens connector halves, which is beneficial in terms of fabrication and storage.

I claim:

1. Lens connector for optical through-connection of light guides, comprising two lens connector halves whose frontal faces face one another and which each comprises a coupling housing provided with an internal space open at the front and rear of the coupling housing and with an optical system housed in the front portion of the internal space, the end of the light guide being fastened in the rear portion of the internal space, the abovementioned elements being arranged such that in the one lens connector half the light beam emanating from the guide fastened therein is transformed into a parallel light beam by the optical system and in the other lens connector half the received light beam is focused, by the optical system housed therein, onto the light guide associated therewith, in which a transparent front plate is fastened centrally to the front of the coupling housing, the frontal face of which is oriented perpendicular to the optical axis of the light beams through the optical system and projects outside the front of the coupling housing, wherein means are provided for forcing the frontal faces of the front plates onto each other.

2. Lens connector according to claim 1, wherein the front plate consists of hard scratch resistant material.

3. Lens connector according to claim 1, wherein the front plate is made of sapphire.

4. Lens connector according to claim 1, wherein the inside face of the front plate is provided with an antireflective coating.

5. Lens connector according to claim 3, wherein the inside face of the front plate is provided with an antireflective coating.

6. Lens connector according to claim 1, wherein the coupling housing comprises separate lens and guide accommodation sections which are fastened to one another by means of fastening means.

7. Lens connector according to claim 3, wherein the coupling housing comprises separate lens and guide accommodation sections which are fastened to one another by means of fastening means.

8. Lens connector according to claim 6, wherein the lens and/or guide accommodation sections consist of a material having an expansion coefficient which all but matches the expansion coefficient of the material of the front plate.

9. Lens connector according to claim 8, wherein the lens and/or guide accommodation sections consist of titanium of titanium-containing material.

10. Connector according to claim 1 wherein the lens connector halves are indicated to one another.

11. Lens connector half of a lens connector according to claim 1.

12. Optical connector which consists of two connector halves and is provided with one or more lens connectors according to claim 1, which are housed in the internal space of a sheath housing which comprises two sheath housing halves whose front faces face each other, wherein each lens connector half of the lens connectors is joined to the respective sheath housing half by means of a flexible fastening means.

13. Optical connector which consists of two connector halves and is provided with one or more lens connectors according to claim 3, which are housed in the internal space of a sheath housing which comprises two sheath housing halves whose front faces face each other, wherein each lens connector half of the lens connectors is joined to the respective sheath housing half by means of a flexible fastening means.

14. Optical connector which consists of two connector halves and is provided with one or more lens connectors according to claim 9, which are housed in the internal space of a sheath housing which comprises two sheath housing halves whose front faces face each other, wherein each lens connector half of the lens connectors is joined to the respective sheath housing half by means of a flexible fastening means.

15. Optical connector according to claim 12, wherein the fastening means is an element which consists of silicone rubber which is attached, on the one hand, to the respective lens connector halves and, on the other hand, to the sheath housing half.

16. Optical connector according to claim 14, wherein the fastening means is an element which consists of silicone rubber which is attached, on the one hand, to the respective lens connector halves and, on the other hand, to the sheath housing half.

17. Connector according to claim 14, wherein the lens connector halves are identical to one another.

18. Lens connector half of a lens connector according to claim 14.

19. Optical connector half of an optical connector according to claim 14.

20. Optical connector half of an optical connector according to claim 15.

* * * * *